United States Patent
Lane et al.

(10) Patent No.: US 9,316,162 B2
(45) Date of Patent: Apr. 19, 2016

(54) METHOD OF CONTROLLING A FUEL SUPPLY SYSTEM OF AN ENGINE OF A MOTOR VEHICLE

(71) Applicant: Ford Global Technologies, LLC, Dearborn, MI (US)

(72) Inventors: Stuart Lane, Stratford (GB); Donatus Andreas Josephine Kees, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 14/103,689

(22) Filed: Dec. 11, 2013

(65) Prior Publication Data

US 2014/0163847 A1    Jun. 12, 2014

(30) Foreign Application Priority Data

Dec. 12, 2012 (GB) .................................. 1222303.8

(51) Int. Cl.
| | |
|---|---|
| *G06F 19/00* | (2011.01) |
| *F02D 33/00* | (2006.01) |
| *F02D 41/04* | (2006.01) |
| *F02D 41/38* | (2006.01) |
| *F02D 41/40* | (2006.01) |
| *F02M 37/00* | (2006.01) |

(52) U.S. Cl.
CPC ............. *F02D 33/006* (2013.01); *F02D 41/042* (2013.01); *F02D 41/3845* (2013.01); *F02D 41/406* (2013.01); *F02M 37/0041* (2013.01); *Y02T 10/44* (2013.01)

(58) Field of Classification Search
CPC ...... F02D 41/042; F02D 41/06; F02D 41/062

USPC .................... 701/112, 113; 123/445, 447, 456
See application file for complete search history.

(56) References Cited

U.S. PATENT DOCUMENTS

| | | | |
|---|---|---|---|
| 4,683,844 | A | 8/1987 | Arai et al. |
| 7,574,994 | B2 | 8/2009 | Scheurer et al. |
| 7,717,077 | B2 | 5/2010 | Prior |
| 8,091,518 | B2 | 1/2012 | Shikida et al. |

(Continued)

FOREIGN PATENT DOCUMENTS

| | | |
|---|---|---|
| EP | 0886058 B1 | 11/2004 |
| JP | H04246253 A | 9/1992 |

(Continued)

OTHER PUBLICATIONS

"Fuel Supply System to the Low-Pressure Stage," excerpt from Diesel-Engine Management, pp. 82-89, 3rd Ed., Bosch Handbooks (REP) Series, #3, Published Feb. 27, 2004, 7 pages.

*Primary Examiner* — John Kwon
(74) *Attorney, Agent, or Firm* — Julia Voutyras; Alleman Hall McCoy Russell & Tuttle LLP

(57) ABSTRACT

A method of controlling a fuel supply system of an engine 10 of a motor vehicle 50 is disclosed in which an engine driven variable output high pressure fuel pump is operated at a high demand level to charge a high pressure fuel accumulator with fuel during a shutdown of the engine and, during a subsequent start-up of the engine, use fuel from the accumulator while operating the high pressure fuel pump at a low demand level. This reduces the fuel consumption of the engine by using kinetic energy from the slowing engine to drive the high pressure fuel pump and increases the deceleration of the engine.

20 Claims, 11 Drawing Sheets

(56) References Cited

U.S. PATENT DOCUMENTS

| | | | |
|---|---|---|---|
| 2002/0184884 A1* | 12/2002 | McCarty | F02C 7/22 60/773 |
| 2009/0120397 A1 | 5/2009 | Prior | |
| 2010/0050433 A1 | 3/2010 | Harada et al. | |
| 2011/0214643 A1* | 9/2011 | Blizard | F02M 53/02 123/468 |
| 2013/0110383 A1* | 5/2013 | McDonald | F02D 41/042 701/113 |

FOREIGN PATENT DOCUMENTS

| | | |
|---|---|---|
| JP | H10159683 A | 6/1998 |
| JP | 2000054926 A | 2/2000 |
| JP | 2003065104 A | 3/2003 |
| JP | 2004036459 A | 2/2004 |
| JP | 2004301047 A | 10/2004 |
| JP | 2006348908 A | 12/2006 |
| JP | 2011132872 A | 7/2011 |

* cited by examiner

METHOD OF CONTROLLING A FUEL SUPPLY SYSTEM OF AN ENGINE OF A MOTOR VEHICLE

CROSS REFERENCE TO RELATED APPLICATIONS

The present application claims priority to Great Britain Patent Application No. 1222303.8, entitled "A Method of Controlling a Fuel Supply System of an Engine of a Motor Vehicle," filed on Dec. 12, 2012, the entire contents of which are hereby incorporated by reference for all purposes.

FIELD

This invention relates to motor vehicles and in particular to the control of a fuel system of an engine of a motor vehicle during shutdown and start-up of the engine.

BACKGROUND/SUMMARY

It is known to provide a motor vehicle with an engine stop-start system for automatically stopping and starting the engine whenever it is determined from driver actions that there is an opportunity to do so in order to reduce fuel consumption and reduce emissions from the engine.

However, the inventors herein have recognized potential issues with such engine stop-start systems. As one example, if the time taken to stop and then restart the engine is excessive, the delay may lead to dissatisfaction in a user of the motor vehicle. In addition, such an excessive delay, may also result in actual use problems if the driver wrongly concludes that the system has failed to restart the engine in response to their actions.

In one example, the issues described above may be addressed by a method for . . . controlling a fuel supply system of an engine of a motor vehicle wherein the method comprises, during a shutdown of the engine, operating an engine driven variable output high pressure fuel pump at a high demand level and storing fuel from the high pressure fuel pump in a fuel accumulator and, during a subsequent engine start-up, operating the high pressure fuel pump at a low demand level and supplying fuel from the accumulator to the engine.

In another example, a fuel supply system of an engine of a motor vehicle comprising an engine driven variable output high pressure fuel pump, a fuel accumulator to store fuel at high pressure, a valve means to control the flow of high pressure fuel within the system and an electronic controller to control the operation of the high pressure fuel pump and the valve means, wherein the controller is operable during a shutdown of the engine, to operate the high pressure fuel pump at a high demand level and control the valve means to store fuel from the high pressure fuel pump in the fuel accumulator and is operable, during a subsequent engine start-up, to operate the high pressure fuel pump at a low demand level and operate the valve means so that fuel from the fuel accumulator is supplied to the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
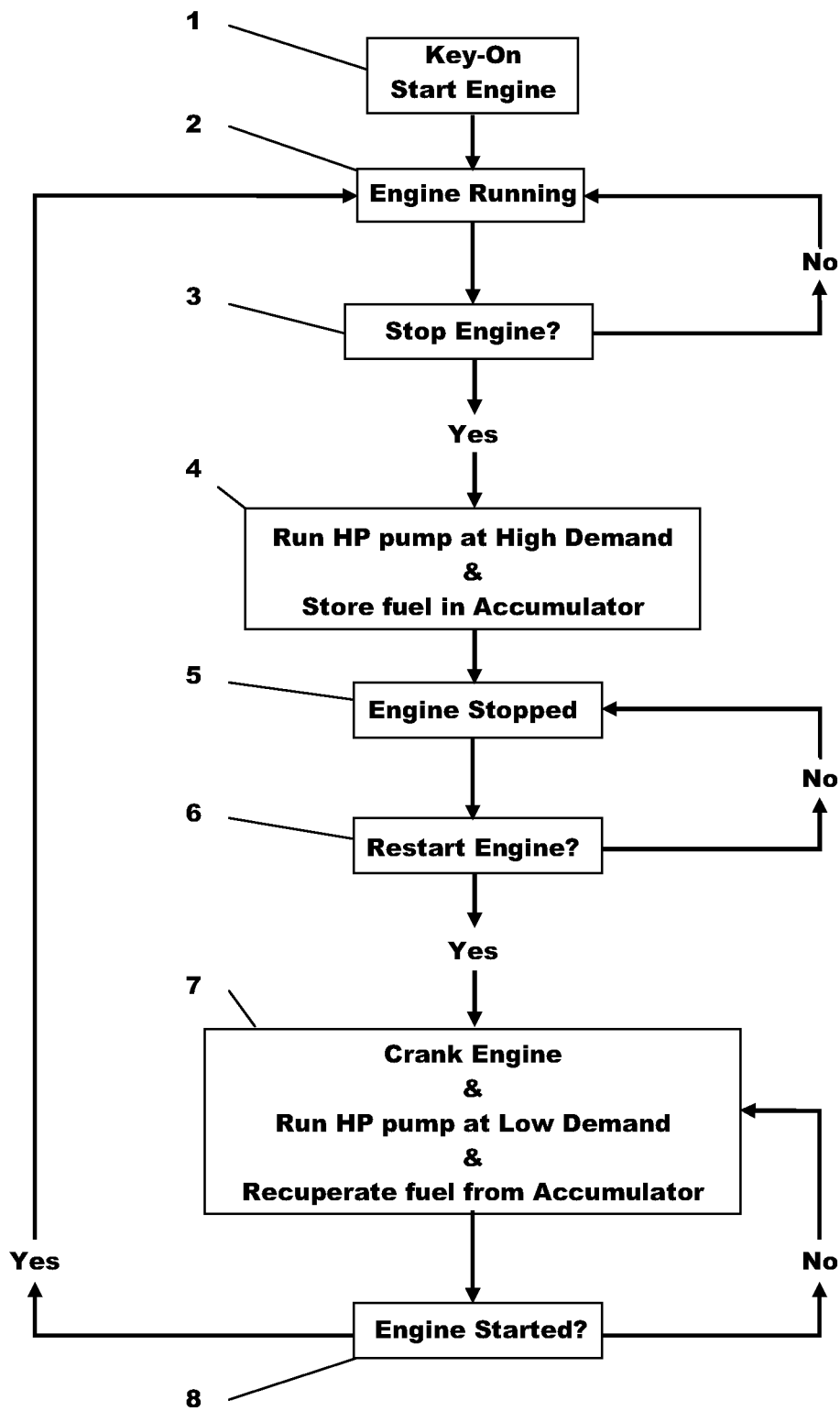
FIG. 1 shows a method of controlling a fuel system of an engine of a motor vehicle in accordance with a first aspect of the invention.

With reference to FIG. 1 there is shown a high level flow chart of a method of controlling a fuel supply system of an engine of a motor vehicle according to the invention.

The method starts at box 1 which are manual key-on and engine start events. The method then advances to box 2 where the engine is running and then on to box 3 where it is checked whether the engine is to be stopped. This can be a manual stop by a driver of the motor vehicle or an automated stop initiated by a stop-start system in the case of a stop-start enabled motor vehicle.

If the engine is not to be stopped the method returns to box 2 and then cycles between boxes 2 and 3 until the engine is to be stopped. When it is determined in box 3 that the engine is to be stopped the method advances to box 4 where a variable output high pressure fuel pump for the engine is operated at a high demand level and fuel pumped by the high pressure pump is stored in a high pressure fuel accumulator until, as indicated in box 5, the engine has stopped. Preferably, the high pressure fuel pump is operated at its maximum demand level because this will impose the greatest load on the engine. The pressure of the fuel stored in the accumulator is at a pressure suitable for injection into the engine as described with respect to a start-up of the engine hereinafter.

There are two primary advantages associated with the processes described in box 4. Firstly, during the subsequent engine cranking and re-start no electricity from the battery and hence no fuel has to be used by the engine to charge the accumulator with high pressure fuel because kinetic energy from the slowing engine is recovered to drive the high pressure pump thereby improving the overall fuel consumption of the engine. Secondly, because operating the high pressure fuel pump at a high demand level requires a considerable driving force to be provided from the engine, the high pressure fuel pump acts as a brake increasing the rate at which the engine slows down. This braking effect will reduce the time taken for the engine to stop after the engine stop is initiated and will also reduce any tendency for the engine to run in reverse (overshoot zero) which is undesirable. In the case of a stop-start enabled motor vehicle the time taken for the engine to stop is important because it significantly affects the minimum cycle time possible for a stop-start event. Therefore, if the engine needs to be restarted as soon as it has stopped, a shorter shutdown period will allow the engine to be started sooner than would otherwise be the case.

After box 5 the method advances to box 6 with the engine stopped and, in box 6, it is checked whether the engine is to be restarted. If the engine is not to be restarted, the method cycles back through box 5 to box 6 with the engine stopped. However, if in box 6 it is confirmed that the engine is to be started, the method advances from box 6 to box 7. The restart can be a manual one by the driver of the motor vehicle or an automated start initiated by a stop-start system in the case of a stop-start enabled motor vehicle.

In either case, in box 7 the engine is cranked by a starter motor or any other suitable cranking device such as, for example and without limitation, an integrated starter generator (ISG), the high pressure fuel pump is operated at a low demand level and fuel is recuperated from the accumulator to fuel the engine by means of one or more fuel injectors. Because the fuel stored in the accumulator is at a pressure suitable for injection into the engine via the fuel injectors, there is no need for fuel to be supplied from the high pressure fuel pump during the engine start-up and so the low demand level set is advantageously the minimum demand level possible for the high pressure fuel pump and is preferably a demand level of zero.

One advantage of the use of a low demand level is that it reduces the load normally imposed by the high pressure fuel pump on the engine and therefore reduces the time taken for the engine to reach a self-sustaining rotational speed for the engine and, perhaps more importantly, the time taken to reach a speed Nt where useful torque can be produced by the engine. The speed Nt is an engine speed below which the application of a load to the engine will likely result in stalling of the engine whereas above this speed Nt useful torque can be produced.

One advantage of the use of fuel from the accumulator during the start-up is that, if an engine driven high pressure fuel pump is used to provide fuel for the engine, the engine cannot be started at the first available opportunity because it takes time for the high pressure fuel pump to build pressure after drive to the fuel pump commences. However, by using fuel stored in the accumulator at a pressure that it is suitable for efficient injection to the engine, then, as soon as the first opportunity for injection occurs, fuel can be injected into the engine thereby further reducing the time taken for the engine to reach the self-sustaining speed.

The method advances from box 7 to box 8 where it is checked whether the engine has started, that is to say reached a self-sustaining rotational speed where the starter motor can be switched off or disengaged. If the self-sustaining engine speed has not been reached, the method cycles back through box 7 to box 8 until the self-sustaining engine speed has been reached.

In the event that the engine has failed to start and the fuel in the accumulator has been exhausted to a level where there is no longer sufficient pressure to provide efficient fuel injection for the engine then, although not shown on FIG. 1, a fault routine is enabled in which fuel is provided from the high pressure fuel pump to the engine. If, after a predetermined period of time, the engine has still not started a warning can be given to the driver of the motor vehicle and starting of the engine can be temporarily inhibited to prevent damage occurring to the starter motor.

Referring back to box 8, if the engine has started then the method returns to box 2 with the engine running.

After the engine has reached the required self-sustaining speed the fuel supply may be switched from the accumulator to the fuel pump or may remain from the accumulator until the pressure in the accumulator falls to a predefined level or a power demand for the engine is above a predefined level.

It will be appreciated that the above method can be ended at any time by a manual key-off event. In the event of a manual key-off event occurring it is preferable if the method steps of box 4 are used because then fuel is stored without incurring a fuel penalty that can be used in a subsequent key-on and start-up event such as that shown as box 1 in FIG. 1. That is to say, box 1 could include the steps shown in box 7 of FIG. 1. This has the advantages of reduced fuel use and improved start-up performance. The reduced driving force required from the high pressure fuel pump during start-up would be particularly advantageous in the case of a cold start-up of a diesel engine where the combination of high friction and cranking loads place a considerable strain on the starter motor and associated electrical system.

The above method is particularly advantageous in the case of a stop-start enabled motor vehicle because it significantly reduces the time taken to stop and then restart the engine and so reduces the risk of driver dissatisfaction or erroneous conclusions regarding the operating state of the stop-start system.

Figure 2:
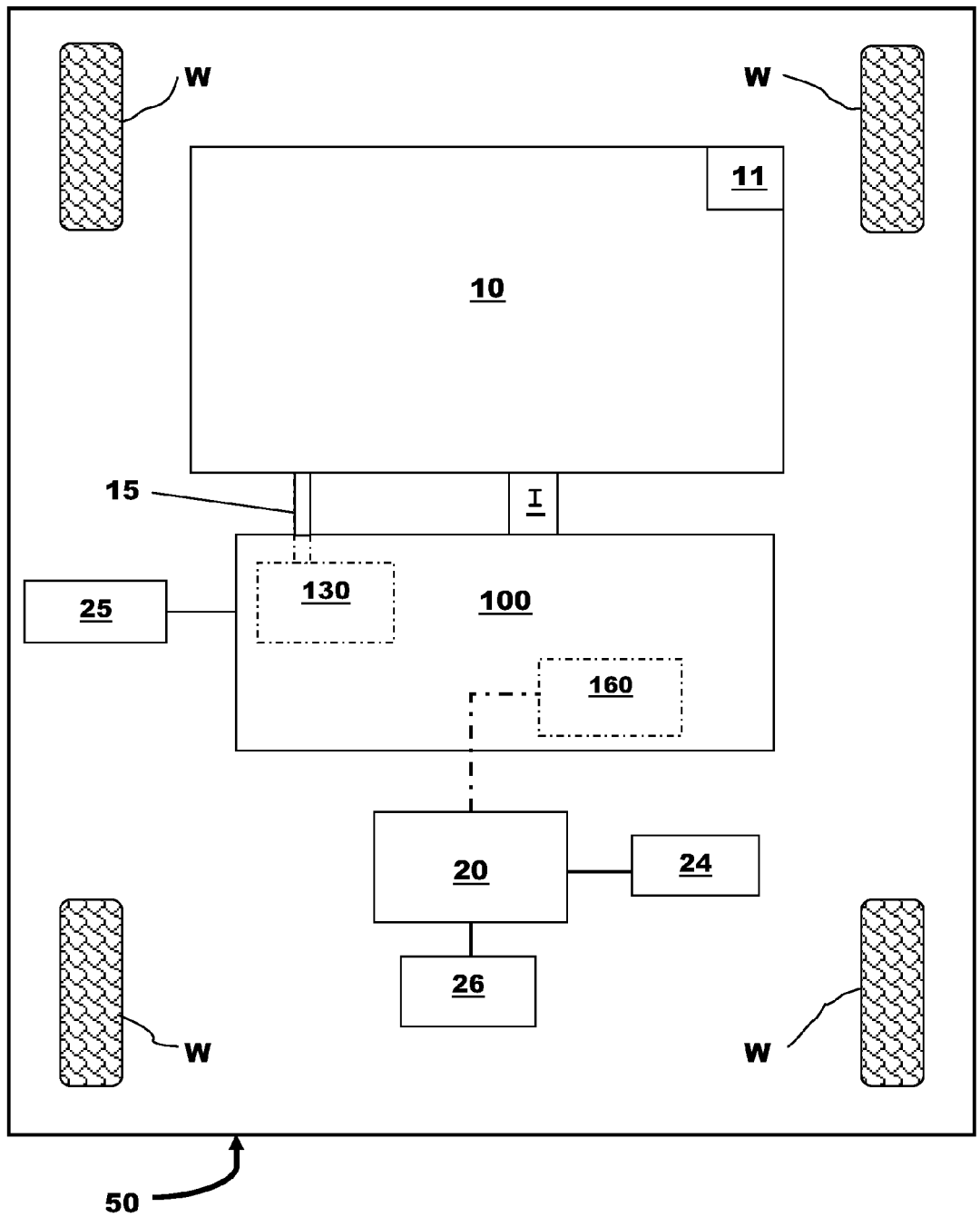
FIG. 2 shows a schematic plan view of a motor vehicle according to a third aspect of the invention having a fuel supply system according to a second aspect of the invention

With particular reference to FIG. 2 there is shown a motor vehicle 50 having four road wheels 'W', a diesel engine 10, a fuel supply system 100 for the engine 10 and a stop-start system 20. Although the invention is described with reference to a diesel engine it will be appreciated that it could be applied to other engine types that utilise a high pressure fuel injection system such as, for example and without limitation, a direct injection gasoline engine.

The engine 10 is driveably connected in this case to two of the road wheels by a transmission (not shown) but it will be appreciated that the transmission could in other embodiments driveably connect the engine 10 to all four of the road wheels 'W'. It will also be appreciated that the invention is not limited to use with a four wheeled road vehicle and could be applied to a vehicle having two wheels or more than four wheels.

A starter motor 11 is provided to the start when required the engine 10. It will however be appreciated that any suitable cranking means could be used.

The fuel system 100 receives a number of vehicle information inputs 25 that are used by the fuel supply system 100 to control the fuelling of the engine 10 via one or more fuel injectors 'I'. Such inputs 25 are well known in the art and may include, for example and without limitation, engine speed, driver demand, mass air flow, air temperature, coolant temperature, ambient temperature and ambient atmospheric pressure.

The fuel supply system includes an electronic controller 160 and an engine driven variable output high pressure fuel pump 130 that is driven, as is well known in the art, by a mechanical drive 15 from one end of a camshaft (not shown) of the engine 10. It will however be appreciated by those skilled in the art that other mechanical drive means could be used and that the invention is not limited to the use of a camshaft driven high pressure fuel pump 130.

Variable output high pressure fuel pumps are known from, for example and without limitation, US Patent Application 20120177505 and PCT patent publication WO2012113488.

The fuel supply system 100 is described in greater detail with reference to four embodiments shown FIGS. 3 to 6 respectively hereinafter.

The motor vehicle is in this case a 'stop-start enabled' motor vehicle 50 because the engine 10 can be stopped and started automatically by the stop-start system 20 based upon driver and vehicle information inputs 24, 25. It will be appreciated that the invention could be applied to a motor vehicle that is not 'stop-start enabled' or to a hybrid motor vehicle whether or not the hybrid vehicle is 'stop-start enabled'. However, the invention is particularly advantageous with respect to its use on any 'stop-start enabled' motor vehicle.

The driver inputs 24 are inputs that provide information to the stop-start system 20 regarding operation of vehicle controls such as, for example, the movement or position of an accelerator pedal, a brake pedal or a clutch pedal or the engagement state of the transmission.

The vehicle information inputs 26 are inputs that provide information to the stop-start system 20 regarding operation of the motor vehicle 50 such as, for example and without limitation, the speed of the motor vehicle, engine speed, the temperature of coolant for the engine, the operating state of an air-conditioning unit if fitted, the state of charge of a battery of the motor vehicle.

Such stop-start systems are well known in the art and the functionality and logic applied in such systems is not relevant to the enablement of this invention. It is merely necessary to know that the stop-start system 20 is operable to stop the engine 10 when a particular combination of driver input states and vehicle information input states is present and restart the engine 10 when a further set of driver input states and vehicle information input states is present.

Although the electronic controller 160 of the fuel supply system 100 and the stop-start controller 20 are shown in FIG. 2 as separate units it will be appreciated that they could be embodied as a single electronic controller such as a powertrain controller.

Figure 3:
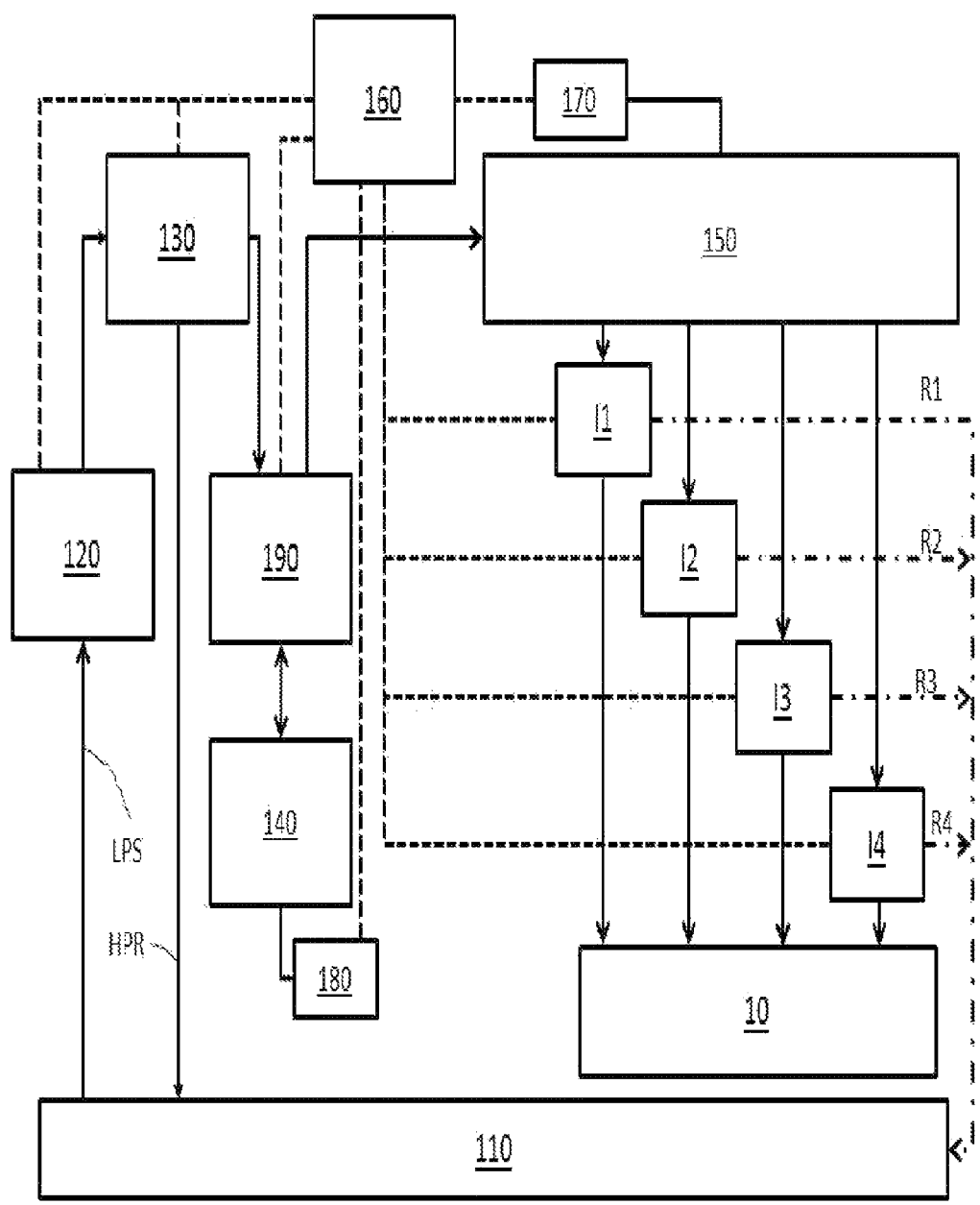
FIG. 3 shows a schematic diagram of a first embodiment of the fuel supply system shown in FIG. 2

Referring now to FIG. 3 there is shown in greater detail a first embodiment of the fuel supply system shown in FIG. 2.

The fuel supply system 100 comprises of a fuel reservoir or fuel tank 110 used to store fuel for use by the engine 10. Fuel is drawn from the fuel tank 110 by a low pressure fuel pump 120 and is supplied to an inlet of the variable output high pressure fuel pump 130 via a low pressure fuel supply line LPS. The high pressure fuel pump 130 is controlled by the electronic controller 160 between a minimum demand level and a maximum demand level. The minimum demand level will preferably result in a fuel flow rate from the high pressure fuel pump 130 of substantially zero and the maximum demand level will result in the maximum possible flow from the high pressure fuel pump 130 for the current engine speed. When operating at the minimum demand level, the high pressure fuel pump 130 requires a minimal driving force to be provided from the engine 10 and, when operating at the maximum demand level, the high pressure fuel pump 130 requires a high driving force to be supplied from the engine 10. Excess or leaked fuel from the high pressure fuel pump 130 is returned to the fuel tank 110 via a low pressure return line HPR.

A valve means in the form of a single electronically controlled three way diverter valve 190 is connected to an output from the high pressure fuel pump 130 so as to receive a flow of fuel at high pressure therefrom.

Figure 10A:
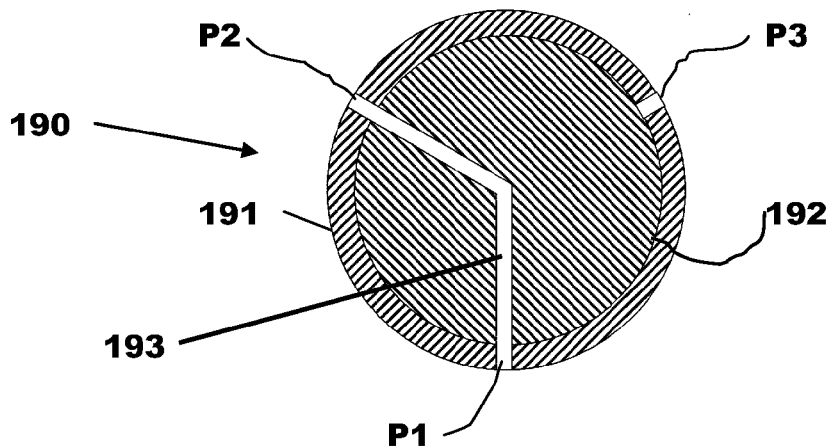
FIG. 10A-C shows a diagrammatic representations of a high pressure fuel flow diverter valve showing the valve in three different flow path states
Figure 10B:
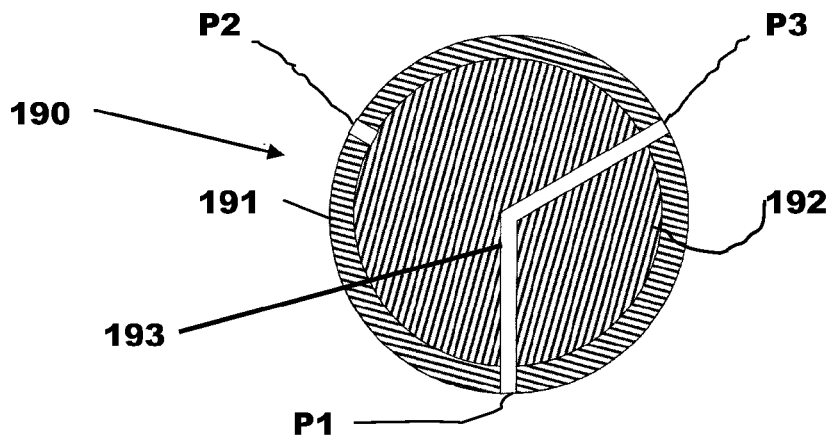
Figure 10C:
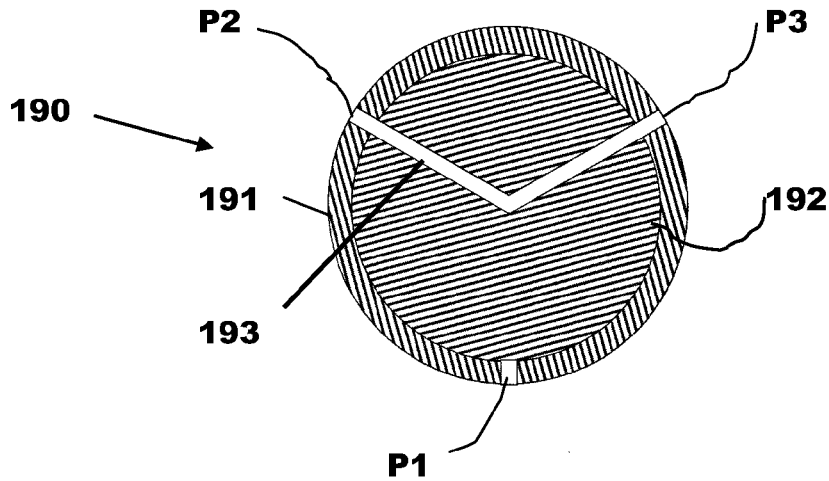

The diverter valve 190 is best understood with reference to FIGS. 10a to 10c and has three selectable fuel flow paths. By way of example, a rotary diverter valve 190 is shown in FIGS. 10a to 10c having a body 191 in which is rotatably mounted a valve member 192 defining a fuel flow passage 193. The body 191 has first port P1 connected to the high pressure fuel pump 130, a second port P2 connected to a common fuel rail 150 and a third port P3 connected to a high pressure fuel accumulator 140.

The diverter valve 190 is interposed between the high pressure fuel pump 130 and the common fuel rail 150, between the high pressure fuel pump 130 and the accumulator 140 and between the accumulator 140 and the common fuel rail 150.

In FIG. 10a the valve member 192 is shown in a position in which the fuel flow passage 193 defines a first flow path connecting the high pressure fuel pump 130 to the common fuel rail 150.

In FIG. 10b the valve member 192 is shown in a position in which the fuel flow passage 193 defines a second flow path connecting the high pressure fuel pump 130 to the accumulator 140.

In FIG. 10c the valve member 192 is shown in a position in which the fuel flow passage 193 defines a third flow path connecting the accumulator 140 to the common fuel rail 150.

The valve member 192 is rotatable by an electric actuator (not shown) in response to a control input from the electronic controller 160 so that the selection of flow path is controlled by the electronic controller 160.

It will be appreciated that alternative forms of three way diverter valve could be constructed and that the invention is not limited to the rotary diverter valve 190 shown in FIGS. 10a to 10c.

Referring back now to FIG. 3, the common fuel rail 150 is arranged to supply fuel to four fuel injectors I1, I2, I3 and I4, the operation of each of which is controlled by the electronic controller 160.

Each of the fuel injectors I1, I2, I3 and I4 supply fuel to the engine 10 at the timing and volume required based upon a respective control input received from the electronic controller 160. Excess fuel from the fuel injectors I1, I2, I3 and I4 is returned to the fuel tank 110 via respective low pressure return lines R1, R2, R3 and R4.

It will be appreciated that the invention is not limited to use with four fuel injectors and that a fuel supply system have less or more fuel injectors could beneficially utilise the invention.

A fuel pressure sensor 170 is arranged to sense the pressure of fuel in the common fuel rail 150 and supply a signal indicative of the sensed pressure to the electronic controller 160.

Figure 11A:
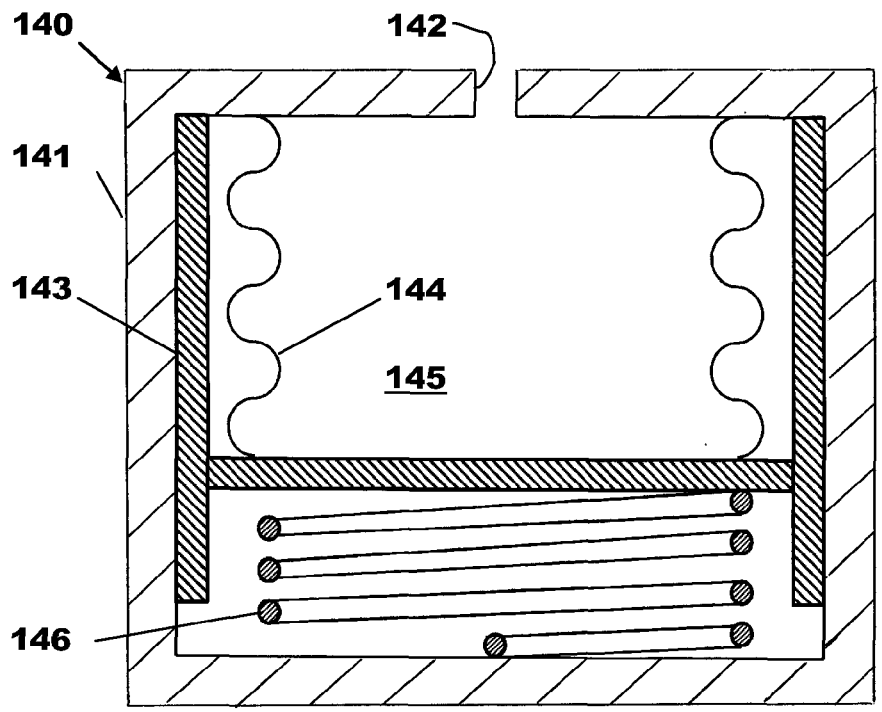
FIG. 11A-B shows a diagrammatic representations of a high pressure fuel accumulator suitable for use in a fuel supply system constructed in accordance with said second aspect of this invention
Figure 11B:
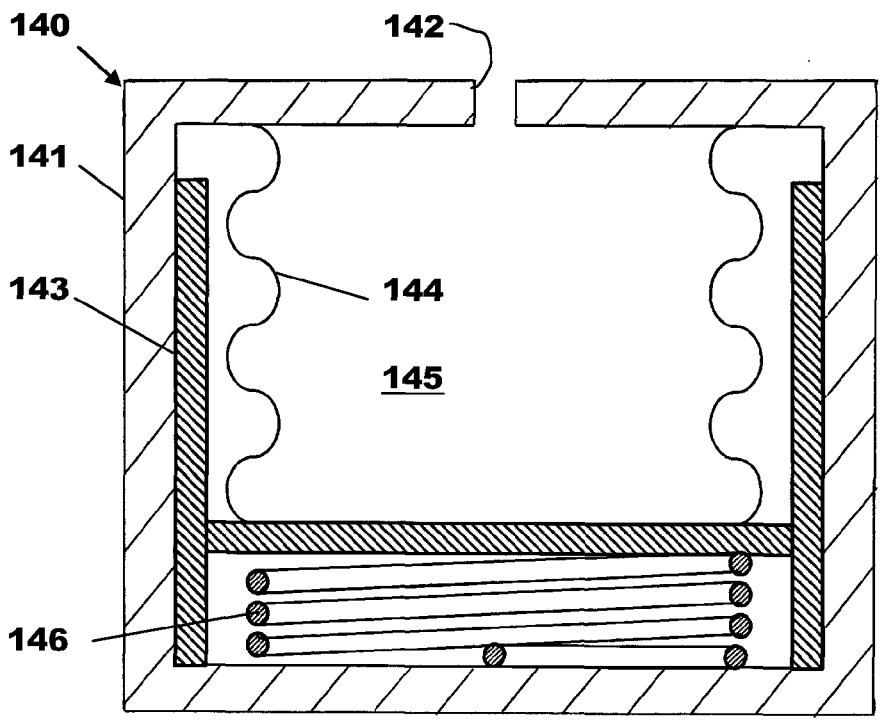

The high pressure accumulator 140 can be of any suitable construction. U.S. Pat. No. 7,717,077 discloses a free piston acted on by a spring for use as a fuel accumulator. Such an arrangement would be suitable for use but it is preferred if a sealed bellows type of accumulator such as that shown in FIGS. 11a and 11b is used because with such an accumulator no fuel can leak from the accumulator whereas with the free piston accumulator shown in U.S. Pat. No. 7,717,077 there is the potential for fuel to leak past the piston.

The accumulator 140 is shown in FIG. 11a in an empty state and in FIG. 11b in a full state. The accumulator comprises a body 141 defining a flow passage 142 by which fuel can enter or leave a storage volume 145 defined by a cup shaped piston, a metal bellows 144 and the body 141. The piston 143 supports the bellows 144 and is slidingly supported by the body 141. A spring 146 biases the piston 143 towards the end of the body 141 at which fuel enters or leaves the storage volume 145 via the flow passage 142. The bellows 144 is sealed to both the body 141 and the piston 143 and so there is no possibility of leakage of fuel. It will be appreciated that in practice the body 141 will not be a single component but will be constructed to enable assembly of the various components 143, 144, 146.

A fuel pressure sensor 180 is arranged to sense the pressure of fuel in the accumulator 140 and supply a signal indicative of the sensed pressure to the electronic controller 160.

Operation of the fuel supply system 100 will now be described with reference to FIGS. 7, 8 and 9.

Figure 7:
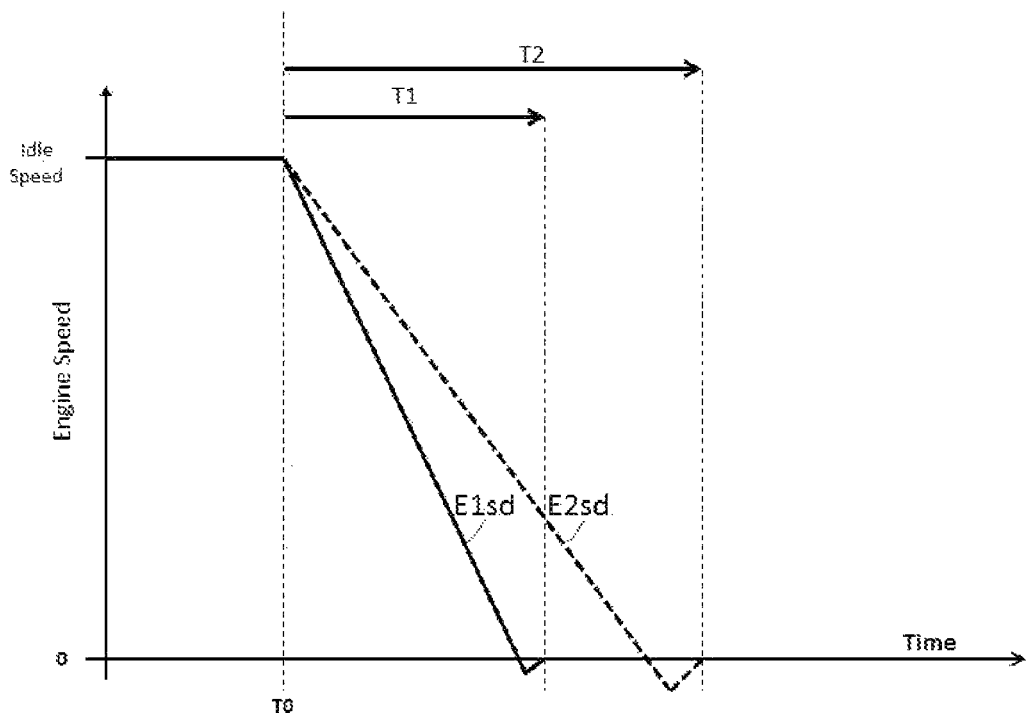
FIG. 7 shows an engine speed versus time chart comparing the shutdown of a prior art engine and an engine having a fuel supply system constructed in accordance with said second aspect of the invention and operated in accordance with a method in accordance with said first aspect of the invention

FIG. 7 shows a relationship between engine speed and time during an engine shutdown for a prior art engine having a stop-start system and fuel supply system with no fuel accumulator and an engine 10 having a stop-start system 20 and a fuel supply system 100 constructed in accordance with this invention.

Referring firstly to the prior art situation, initially the engine is idling and then at time T0 the stop-start system initiates an engine shutdown. In the case of the prior art engine the demand level for the high pressure fuel pump is then reduced to the minimum level because fuel is not required in a conventional fuel supply system having no accumulator. The engine begins to slow at time T0 and will continue to slow, as shown by the line E2sd, until the engine finally stops after a period of engine reverse rotation when T2 seconds have expired from the time T0.

Referring now to the situation when a fuel supply system 100 constructed in accordance with this invention is used, initially the engine 10 is, as before, idling and then, as before, at time T0 the stop-start system 20 initiates an engine shutdown. However, in this case the demand level for the high pressure fuel pump 130 is then increased to or maintained at a high demand level and preferably the maximum possible demand level and fuel is supplied from the high pressure fuel pump 130 to the accumulator 140. The engine 10 begins to slow at time T0 and will continue to slow, as shown by the line E1sd, until the engine 10 finally stops after a period of engine reverse rotation when T1 seconds have expired from the time T0.

The engine 10 will slow more rapidly in this case because it is required to drive the high pressure fuel pump 130 to charge the accumulator 140. In addition, because of the braking effect of the high pressure fuel pump 130 on the engine 10, the magnitude and duration of any reverse engine rotation is reduced.

Therefore the time taken for the engine to stop has been reduced from T2 seconds, in the case of a prior art engine, to T1 seconds, in the case of the engine 10 having a fuel supply system according to the invention, by using the high pressure fuel pump 130 to slow the engine 10.

Operation of the fuel supply system 100 shown in FIG. 3 during the shutdown period is as follows.

Prior to time T0 the electronic controller 160 controls the fuel injectors I1, I2, I3 and I4 so as to provide fuel at the correct timing and volume to the engine 10, sets the demand level for the high pressure fuel pump 130 to a level required to satisfy the fuel usage needs of the engine 10 and controls the three way diverter valve 190 so that it adopts the position shown in FIG. 10a with the valve member 192 in a position in which the fuel flow passage 193 provides a flow path connecting the high pressure fuel pump 130 to the common fuel rail 150.

While in this operating state the fuel supply system 100 operates as a conventional fuel supply system with fuel being drawn from the fuel tank 110 by the low pressure fuel pump 120, supplied to the high pressure fuel pump 130 from the low pressure fuel pump 120, pressurized by the high pressure fuel pump 130 under the control of the electronic controller 160, supplied to the common fuel rail 150 from the high pressure fuel pump 130 and drawn from the common fuel rail 150 by the fuel injectors I1, I2, I3 and I4 for injection into the engine 10 to meet the current operating demands of the engine 10.

At time T0 the electronic controller 160 receives an indication from the stop-start system 20 that the engine 10 is to be stopped. In response to this indication from the stop-start system 20, the electronic controller 160, switches off the fuel injectors I1, I2, I3, I4, sets the demand level for the high pressure fuel pump 130 to a high level, preferably a maximum demand level, and controls the three way diverter valve 190 so that the valve member 192 adopts the position shown in FIG. 10b in which the fuel flow passage 193 defines a flow path connecting the high pressure fuel pump 130 to the accumulator 140. Fuel is then pumped into the accumulator 140 by the high pressure fuel pump 130 until the engine 10 has stopped rotating.

In a case where a signal from the fuel pressure sensor 180 associated with the accumulator 140 indicates that a maximum safe operating pressure for the accumulator 140 has been reached before the engine 10 stops rotating fuel is vented back to the fuel tank 110. This has the advantage that the high pressure fuel pump 130 is still operating at high demand increasing the deceleration of the engine 10.

When the time T1 has elapsed, the engine 10 has stopped rotating and the electronic controller 160 is then preferably operable to control the three way diverter valve 190 so that the valve member 192 adopts the position shown in FIG. 10a in which the fuel flow passage 193 provides a flow path connecting the high pressure fuel pump 130 to the common fuel rail 150. The common fuel rail 150 is therefore isolated from the pressurised fuel within the accumulator 140 while the engine 10 is stationary thereby reducing the risk of leakage from the fuel injectors I1, I2, I3 and I4 while the engine 10 is stationary.

Figure 8:
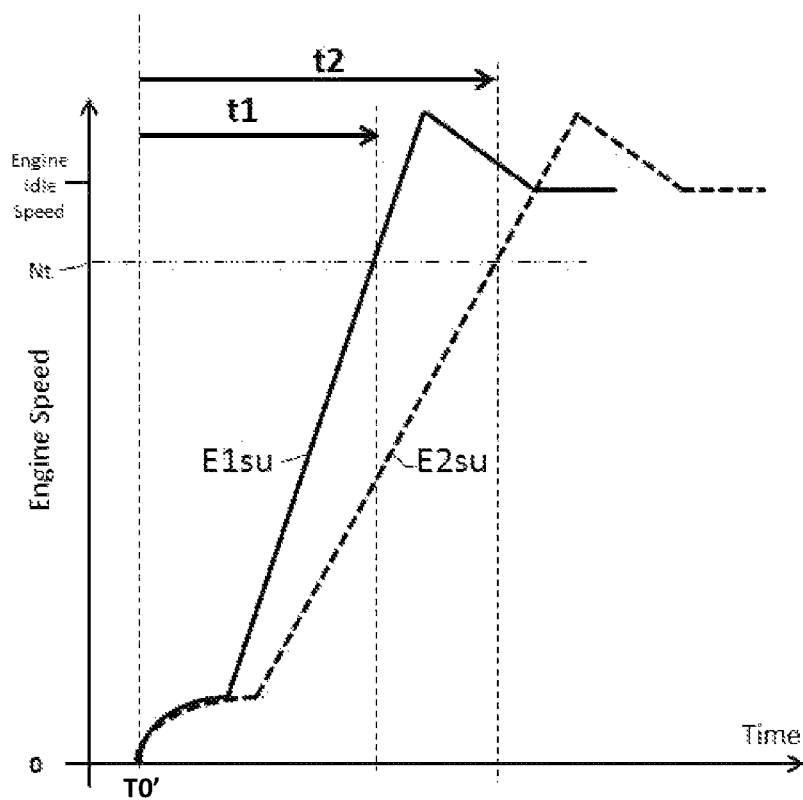
FIG. 8 shows an engine speed versus time chart comparing the start-up of a prior art engine and an engine having a fuel supply system constructed in accordance with said second aspect of the invention and operated in accordance with a method in accordance with said first aspect of the invention

FIG. 8 shows a relationship between engine speed and time during an engine start-up for a prior art engine having a stop-start system and fuel supply system with no fuel accumulator and an engine 10 having a stop-start system 20 and a fuel supply system 100 constructed in accordance with this invention.

Referring firstly to the prior art situation, initially the engine is stationary and then at time T0' the stop-start system initiates an engine start-up. In the case of the prior art engine the demand level for the high pressure fuel pump is at a high level in order to provide fuel for the engine and the fuel injectors are controlled to supply the required quantity of fuel to the engine. The engine begins to rotate at time T0' due to the action of a starter motor and will continue to speed up, as shown by the line E2su, and, at time t2, the engine has reached a speed Nt where it can generate useful power.

Referring now to the situation where a fuel supply system 100 constructed in accordance with this invention is used. As before, initially the engine 10 is stationary and then, as before, at time T0' the stop-start system 20 initiates an engine start-up. However, in this case, the demand level for the high pressure fuel pump 130 is set to a low demand level and is preferably set to a zero demand level. This is made possible because fuel is supplied not by the high pressure fuel pump 130 but from the accumulator 140. The engine 10 begins to rotate at time T0' due to the action of the starter motor 11 and will continue to accelerate, as shown by the line E1sd, and, at time t1, the engine 10 has reached the speed Nt where it can generate useful power.

The engine 10 will accelerate more rapidly in this case because it is not required to drive the high pressure fuel pump 130 to provide fuel to the engine 10. In addition, because the fuel is supplied from the accumulator 140, there is no time delay waiting for the high pressure fuel pump 130 to speed up and generate fuel pressure, the required fuel pressure is immediately available from the accumulator 140 and the first opportunity to inject fuel can be utilised.

Therefore the time taken for the engine to reach the speed Nt from stationary (T0') is reduced from t2 seconds, in the case of a prior art engine, to t1 seconds, in the case of an engine having a fuel supply system according to the invention.

At some point in time after reaching the engine speed Nt, fuelling of the engine 10 is switched back to the high pressure fuel pump 130.

Operation of the fuel supply system 100 shown in FIG. 3 during engine start-up is as follows.

At time T0' or at a point in time after the engine 10 has sensed to have stopped but before the time T0' the electronic controller 160 is also operable to set the demand level for the high pressure fuel pump 130 to a low level and preferably to the lowest possible level which in some cases is a zero flow demand level.

At time T0', the diverter valve 190 is switched from the position shown in FIG. 10a to the position shown in FIG. 10c to supply fuel from the accumulator 140 to the engine 10. This switching occurs very rapidly and will have no significant adverse effect on starting of the engine 10 because the time taken to switch the valve 190 is considerably less than the time taken for the first available cylinder of the engine 10 to reach a potential ignition position.

Therefore, at time T0' when the stop-start system 20 indicates that the engine 10 is to be started and cranking of the engine commences, the electronic controller 160 can control whichever of the fuel injectors I1, I2, I3 and I4 has the first opportunity to inject fuel to the engine 10 to commence injection of fuel into the engine 10 without delay. As fuel is drawn from the common fuel rail 150 by the fuel injectors I1, I2, I3 and I4 it is replaced by fuel supplied to the common fuel rail 150 from the accumulator 140 thereby maintaining the fuel pressure in the fuel rail 150 at an appropriate pressure for efficient injection into the engine 10.

Because the volume of the accumulator 140 is finite, at some point in time after time T0' the electronic controller 160 must control the diverter valve 190 to switch the flow path from the accumulator 140 to the high pressure fuel pump 130. This can occur when the pressure sensor 170 associated with the common fuel rail 150 indicates that the fuel pressure is beginning to drop, when a predefined volume of fuel that is less than the known volume of the accumulator 140 has been injected into the engine or when a power demand on the engine 10 exceeds a predefined level. When this point in time is reached, the electronic controller 160 is operable to control the three way diverter valve 190 so that the valve member 192 moves from the position shown in FIG. 10c to the position shown in FIG. 10a in which the fuel flow passage 193 defines a flow path connecting the high pressure fuel pump 130 to the common fuel rail 150. Fuel is then pumped directly into the common fuel rail by the high pressure fuel pump 130 for use by the engine 10.

Figure 9:
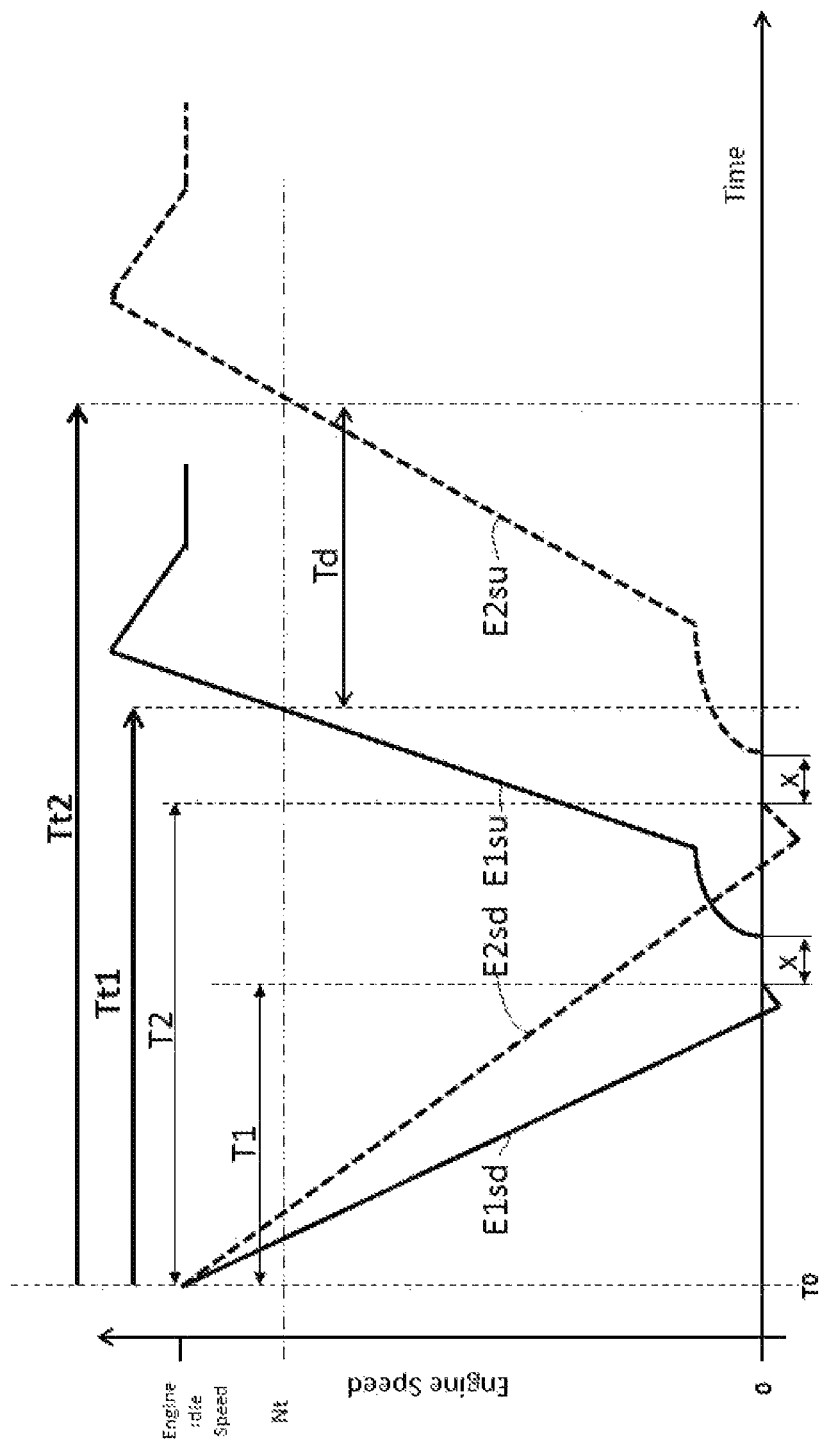
FIG. 9 shows an engine speed versus time chart comparing the shutdown and start-up of a prior art engine and an engine having a fuel supply system constructed in accordance with said second aspect of the invention and operated in accordance with a method in accordance with said first aspect of the invention.

With reference to FIG. 9 the combined effect of the improvements in engine shutdown and engine start-up is shown.

The lines E2sd and E2su are those representing respectively engine speed during shutdown and start-up for a prior art engine and fuel supply system and the lines E1sd and E1su are those representing respectively engine speed during shutdown and start-up for an engine having a fuel supply system constructed in accordance with this invention utilising a control method according to this invention.

The time period "x" is a time delay between the time when the respective engine reaches zero and the time when the subsequent start commences and is identical in both cases. T0 is the point in time when shutdown of the respective engine commences and the time periods T2 and T1 are the periods of time required for the engine to reach zero in the case of a prior art and engine using a fuel supply system and method in accordance with this invention.

In the case of a prior art engine, the time taken from the point in time T0 when the shutdown commences to the point in time where the engine speed reaches a speed Nt where useful power can be produced is Tt2 seconds.

In the case of an engine using a fuel supply system and method in accordance with this invention, the time taken from the point in time T0 when the shutdown commences to the point in time where the engine speed reaches a speed Nt where useful power can be produced is Tt1 seconds.

Therefore a reduction in cycle time of Td seconds is produced by using a fuel supply system and method in accordance with this invention.

Referring now to FIGS. 4, 7, 8 and 9 a second embodiment of fuel supply system is shown that is in many respects the same as that previously described and for which the same components have the same reference numerals.

Figure 4:
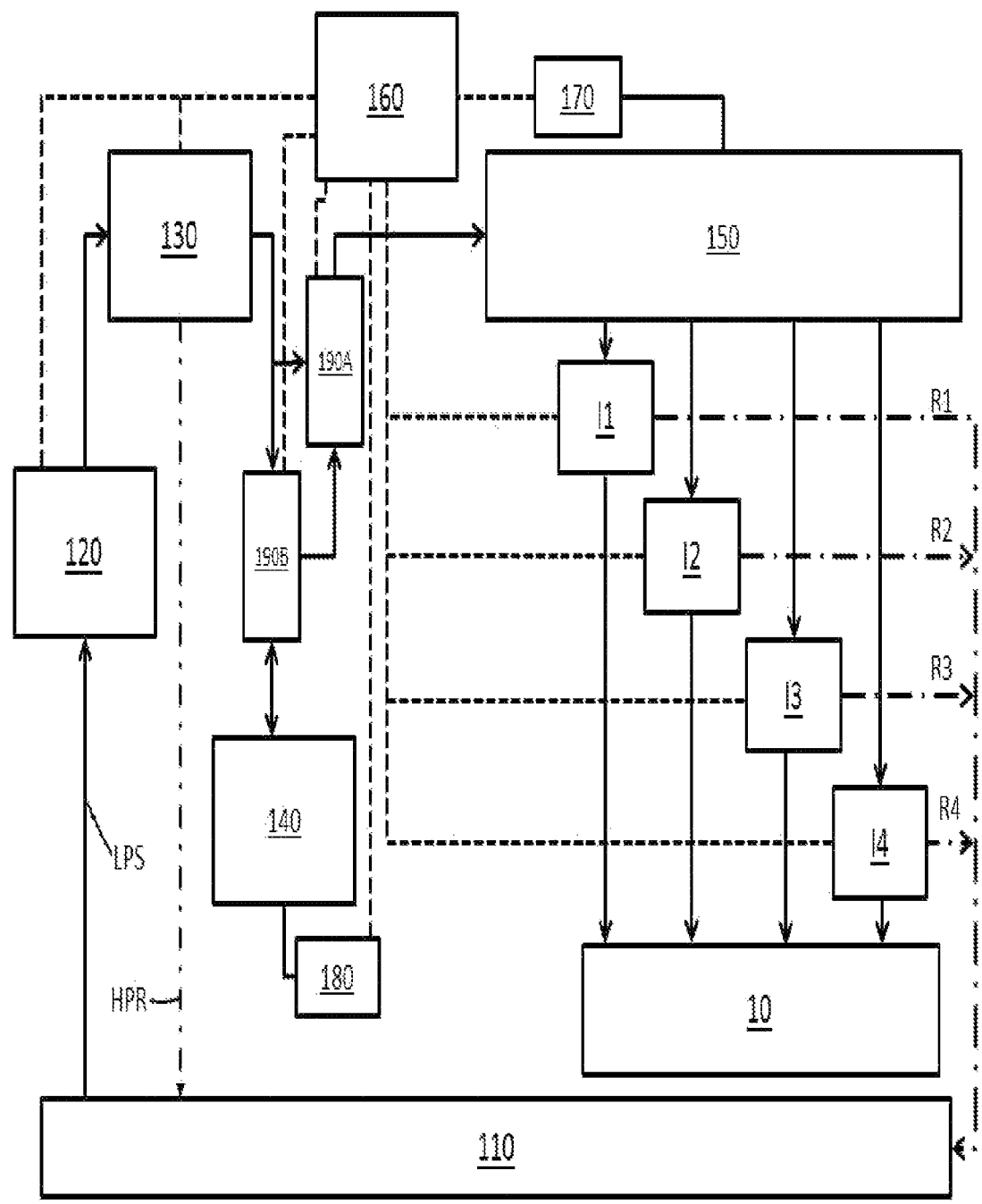
FIG. 4 shows a schematic diagram of a second embodiment of the fuel supply system shown in FIG. 2

The only significant difference between the second embodiment shown in FIG. 4 and the first embodiment shown in FIG. 3 is that the valve means which is a single three way diverter valve 190 in FIG. 3 is replaced by first and second valves 190A, 190B in FIG. 4. The operation of the fuel supply system has the same advantageous effects as previously described and the shutdown and start-up of the engine 10 is as previously described with reference to FIGS. 7, 8 and 9.

Operation of the fuel supply system 100 shown in FIG. 4 during an engine shutdown is as follows.

Prior to time T0 (FIGS. 7 and 9) the electronic controller 160 controls the fuel injectors I1, I2, I3 and I4 so as to provide fuel at the correct timing and volume to the engine 10, sets the demand level for the high pressure fuel pump 130 to a level required to satisfy the fuel usage needs of the engine 10 and controls the two valves 190A, 190B so that fuel flows via first valve 190A to the common fuel rail 150 but cannot flow to the accumulator 140 via the second valve 190B.

A flow path is thereby provided connecting the high pressure fuel pump 130 to the common fuel rail 150.

While in this operating state the fuel supply system 100 operates as a conventional fuel supply system with fuel being drawn from the fuel tank 110 by the low pressure fuel pump 120, is supplied to the high pressure fuel pump 130 from the low pressure fuel pump 120, is pressurised by the high pressure fuel pump 130 under the control of the electronic controller 160, is supplied to the common fuel rail 150 from the high pressure fuel pump 130 and is drawn from the common fuel rail 150 by the fuel injectors I1, I2, I3 and I4 for injection into the engine 10 to meet the current operating demands of the engine 10.

At time T0 the electronic controller 160 receives an indication from the stop-start system 20 that the engine 10 is to be stopped. In response to this indication from the stop-start system 20, the electronic controller 160, switches off the fuel injectors I1, I2, I3, I4, sets the demand level for the high pressure fuel pump 130 to a high level, preferably a maximum demand level, and controls the two valves 190A, 190B so that a flow path connecting the high pressure fuel pump 130 to the accumulator 140 is produced. To do this the first valve 190A is closed and the second valve 190B is opened by the electronic controller 160.

Fuel is then pumped into the accumulator 140 by the high pressure fuel pump 130 until the engine 10 has stopped rotating.

As before, in a case where a signal from the fuel pressure sensor 180 associated with the accumulator 140 indicates that a maximum safe operating pressure for the accumulator 140 has been reached before the engine 10 stops rotating, it will be necessary to vent fuel back to the fuel tank 110.

When the time T1 has elapsed, the engine 10 has stopped rotating and the electronic controller 160 is then preferably operable to control the valve 190A so that there is no flow path connecting the accumulator 140 to the common fuel rail 150. The common fuel rail 150 is therefore isolated from the pressurised fuel in the accumulator 140 while the engine 10 is stationary to prevent leakage from the fuel injectors I1, I2, I3 and I4. Preferably, the valve 190B is also closed to prevent leakage back through the high pressure fuel pump 130.

Operation of the fuel supply system 100 shown in FIG. 4 during a subsequent engine start-up is as follows.

At time T0', the two valves 190A, 190B are moved to the positions required to supply fuel from the accumulator 140 to the engine 10. Also, at time T0', when the stop-start system 20 indicates that the engine 10 is to be started and cranking of the engine commences, the electronic controller 160 controls whichever of the fuel injectors I1, I2, I3 and I4 has the first opportunity to inject fuel to the engine 10 to commence injection of fuel into the engine 10 without delay. As fuel is drawn from the common fuel rail 150 by the fuel injectors I1, I2, I3 and I4 it is replaced by fuel supplied to the common fuel rail 150 from the accumulator 140 thereby maintaining the fuel pressure in the fuel rail 150 at an appropriate pressure for efficient injection into the engine 10.

At time T0' (FIG. 8) or preferably at a point in time after the engine 10 has sensed to have stopped but before the time T0', the electronic controller 160 is also operable to set the demand level for the high pressure fuel pump 130 to a low level and preferably to the lowest possible level which in some cases is a zero flow demand level.

Because the volume of the accumulator 140 is finite, at some point in time after time T0', the electronic controller 160 must control the two valves 190A, 190B to switch the flow path from the accumulator 140 to the high pressure fuel pump 130. This switching can occur when the pressure sensor 170 associated with the common fuel rail 150 indicates that the fuel pressure is beginning to drop, when a predefined volume of fuel that is less than the known volume of the accumulator 140 has been injected into the engine or when a power demand on the engine 10 exceeds a predefined level. To switch the flow path, the electronic controller 160 is operable to control the two valves 190A, 190B so that the second valve 190B is closed and the first valve 190A is opened thereby providing a fuel flow path connecting the high pressure fuel pump 130 to the common fuel rail 150. Fuel is then pumped once again directly into the common fuel rail 150 by the high pressure fuel pump 130 for use by the engine 10.

Referring now to FIGS. 5, 7, 8 and 9 a third embodiment of fuel supply system is shown that is in some respects the same as that previously described and for which the same components have the same reference numerals.

Figure 5:
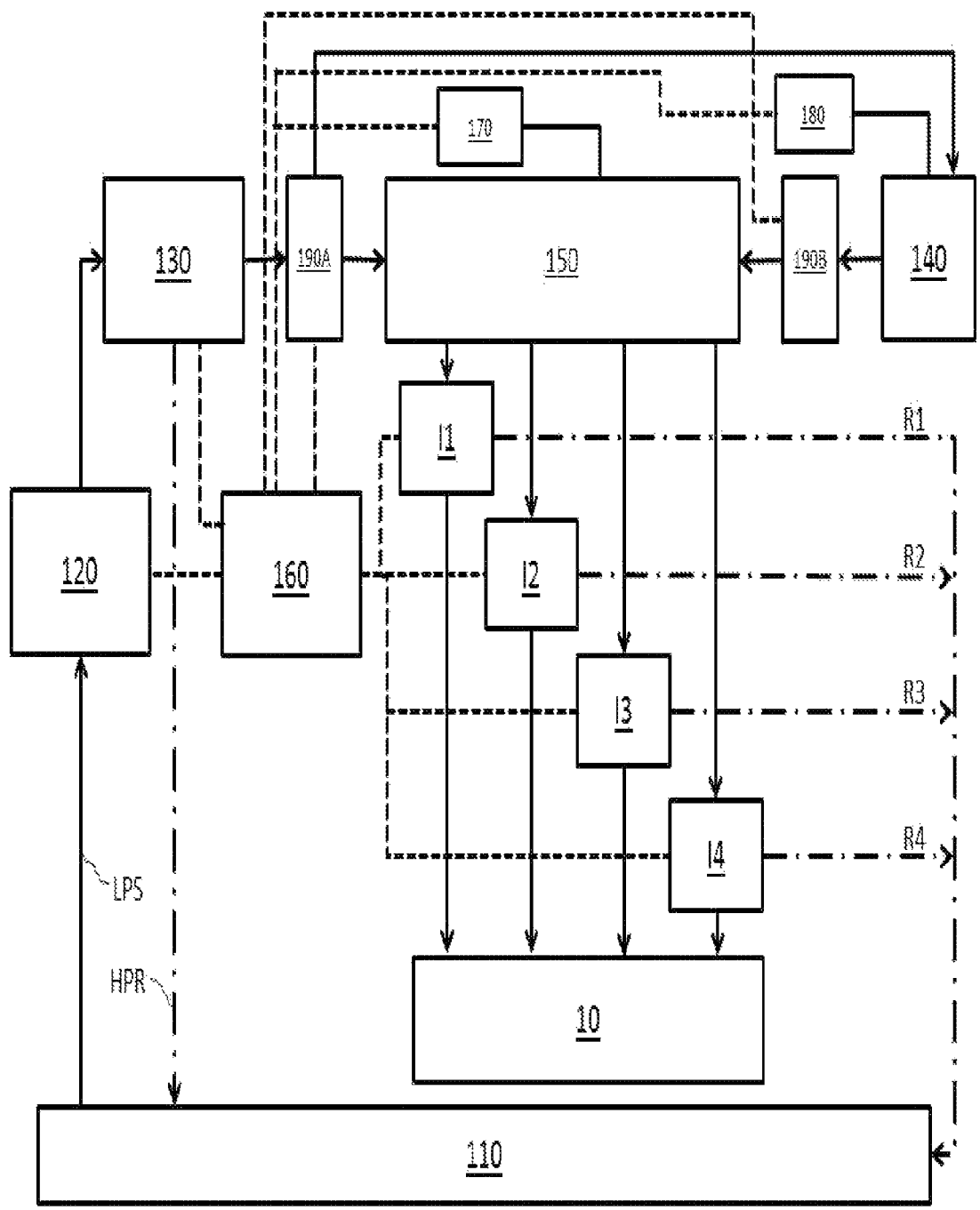
FIG. 5 shows a schematic diagram of a third embodiment of the fuel supply system shown in FIG. 2

The third embodiment shown in FIG. 5 differs from the second embodiment shown in FIG. 4 in that the valve means in the form of the first and second valves 190A, 190B are connected to the common fuel rail 150 in a different manner in FIG. 5.

In FIG. 4 the two valves 190A, 190B are both connected to the common fuel rail 150 by a common supply line whereas in FIG. 5 separate supply lines are used. The flow of fuel does not therefore have to pass from the accumulator 140 through the first valve 190A to reach the common fuel rail 150 in the case of the third embodiment shown in FIG. 5 but does have to in the second embodiment shown in FIG. 4. That is to say, the high pressure fuel pump 130 and the accumulator 140 are independently connectable to the common fuel rail 150 in the case of the third embodiment shown in FIG. 5. In the third embodiment the fuel from the high pressure fuel pump 130 to the accumulator 140 is controlled by the first valve 190A.

Therefore in both embodiments the first valve 190A provides two flow paths whereas the second valve 190B provides only one flow path. The first valve 190A is therefore a two way diverter valve whereas the second valve 190B is a simple flow control valve having at least open and closed positions.

The operation of the fuel supply system shown in FIG. 5 has the same advantageous effects as previously described and the shutdown and start-up of the engine 10 is as previously described with reference to FIGS. 7, 8 and 9.

Operation of the fuel supply system 100 shown in FIG. 5 during an engine shutdown is as follows.

Prior to time T0 (FIGS. 7 and 9) the electronic controller 160 controls the fuel injectors I1, I2, I3 and I4 so as to provide fuel at the correct timing and volume to the engine 10, sets the demand level for the high pressure fuel pump 130 to a level required to satisfy the fuel usage needs of the engine 10 and controls the two valves 190A, 190B so that fuel flows via first valve 190A to the common fuel rail 150 but cannot flow from the accumulator 140 to the common fuel rail 150 via the second valve 190B. To do this the second valve 190B is closed and the first valve 190A is placed in a position in which a flow path between the high pressure fuel pump 130 and the common fuel rail 150 is provided but no flow path is provided between the high pressure fuel pump 130 and the accumulator 140.

While in this operating state the fuel supply system 100 operates as a conventional fuel supply system as previously described with reference to FIGS. 3 and 4.

At time T0 the electronic controller 160 receives an indication from the stop-start system 20 that the engine 10 is to be stopped. In response to this indication from the stop-start system 20, the electronic controller 160, switches off the fuel injectors I1, I2, I3, I4, sets the demand level for the high pressure fuel pump 130 to a high level, preferably a maximum demand level, and controls the two valves 190A, 190B so that a flow path connecting the high pressure fuel pump 130 to the accumulator 140 is produced. To do this, the first valve 190A is moved to a position connecting the high pressure fuel pump 130 to the accumulator 140 and the second valve 190B is kept closed by the electronic controller 160.

Fuel is then pumped into the accumulator 140 by the high pressure fuel pump 130 until the engine 10 has stopped rotating.

As before, in a case where a signal from the fuel pressure sensor 180 associated with the accumulator 140 indicates that a maximum safe operating pressure for the accumulator 140 has been reached before the engine 10 stops rotating, it will be necessary to vent fuel back to the fuel tank 110.

When the time T1 has elapsed, the engine 10 has stopped rotating and the electronic controller 160 is then preferably operable to control the two valves 190A, 190B so that the two valves 190A and 190B provide no flow path connecting the accumulator 140 to the common fuel rail 150. To do this the second valve 190B is closed and the first control valve 190A is preferably left in the current closed position or be repositioned so as to connect the common fuel rail 150 to the high pressure fuel pump 130.

It will be appreciated that if the first valve 190A is not in a flow blocking position then the high pressure fuel pump 130 must either be of a construction where back flow from the high pressure fuel pump 130 to the low pressure fuel pump 120 or fuel tank is not possible or must include a non-return valve to prevent such flow. Such a fuel pump will be referred to hereinafter as being a 'non-return flow' high pressure fuel pump. A non-return fuel pump could be used in other embodiments of fuel supply system shown and described herein.

Operation of the fuel supply system 100 shown in FIG. 5 during a subsequent engine start-up is as follows.

At time T0' (FIG. 8) or at a point in time after the engine 10 has sensed to have stopped but before the time T0' the electronic controller 160 is operable to set the demand level for the high pressure fuel pump 130 to a low level and preferably to the lowest possible level which in some cases is a zero flow demand level.

At time T0', the second valve 190B is opened to a position required to supply fuel from the accumulator 140 to the engine 10 and the common fuel rail 150 is pressurised with fuel. Therefore, at time T0' when the stop-start system 20 indicates that the engine 10 is to be started and cranking of the engine commences, the electronic controller 160 can control whichever of the fuel injectors I1, I2, I3 and I4 has the first opportunity to inject fuel to the engine 10 to commence injection of fuel into the engine 10 without delay. As fuel is drawn from the common fuel rail 150 by the fuel injectors I1, I2, I3 and I4 it is replaced by fuel supplied to the common fuel rail 150 from the accumulator 140 thereby maintaining the fuel pressure in the fuel rail 150 at an appropriate pressure for efficient injection into the engine 10.

As before, because the volume of the accumulator 140 is finite, at some point in time after time T0', the electronic controller 160 must control the two valves 190A, 190B to switch the flow path to the engine 10 from the accumulator 140 to the high pressure fuel pump 130. As previously discussed, this can occur when the pressure sensor 170 associated with the common fuel rail 150 indicates that the fuel pressure is beginning to drop, when a predefined volume of fuel that is less than the known volume of the accumulator 140 has been injected into the engine or when a power demand on the engine 10 exceeds a predefined level.

To achieve this flow switching, the electronic controller 160 is operable to control the two valves 190A, 190B so that the second valve 190B is closed and the first valve 190A is either repositioned or maintained in the position required to provide a fuel flow path connecting the high pressure fuel pump 130 to the common fuel rail 150. Fuel is then pumped once again directly into the common fuel rail 150 by the high pressure fuel pump 130 for use by the engine 10.

Referring now to FIGS. 6, 7, 8 and 9, a preferred or fourth embodiment of fuel supply system is shown that is in some respects the same as that previously described and for which the same components have the same reference numerals.

Figure 6:
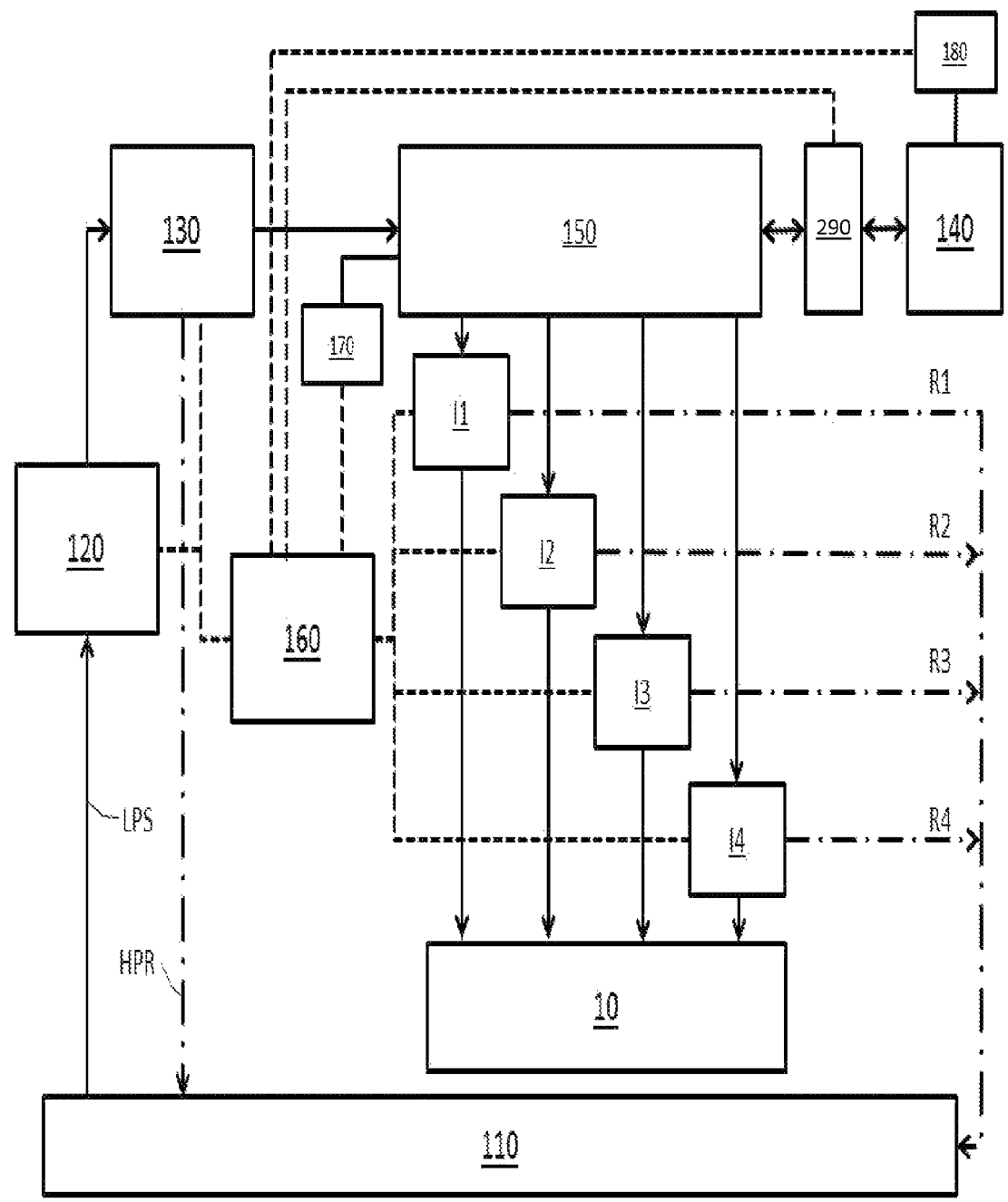
FIG. 6 shows a schematic diagram of a fourth embodiment of the fuel supply system shown in FIG. 2.

The fourth embodiment shown in FIG. 6 differs from the third embodiment shown in FIG. 5 in that the valve means in the form of the first and second valves 190A, 190B used in the third embodiment are replaced by a single valve 290 located in the same position as the second valve 190B and being of the same construction as the simple control valve 190B in that is has at least open and closed positions.

In the fourth embodiment shown in FIG. 6 there is no valve controlling the flow of fuel from the high pressure fuel pump 130 to the common fuel rail 150 and so the high pressure fuel pump 130 is permanently connected to the common fuel rail 150.

The flow of fuel from the accumulator 140 to the common fuel rail 150 is controlled by the electronically controlled valve 290. However, in this case, the flow of fuel can be in either direction through the valve 290 because not only is fuel supplied to the common fuel rail 150 from the accumulator 140 through the valve 290 it is received by the accumulator 140 from the high pressure fuel pump 130 via the common fuel rail 150 and valve 290. Such an arrangement requires the use of a 'non-return' high pressure fuel pump 130 previously referred to with respect to FIG. 5.

The operation of the fuel supply system shown in FIG. 6 has the same advantageous effects as previously described and the shutdown and start-up of the engine 10 is as previously described with reference to FIGS. 7, 8 and 9.

Operation of the fuel supply system 100 shown in FIG. 6 during an engine shutdown is as follows.

Prior to time T0 (FIGS. 7 and 9) the electronic controller 160 controls the fuel injectors I1, I2, I3 and I4 so as to provide fuel at the correct timing and volume to the engine 10, sets the demand level for the high pressure fuel pump 130 to a level required to satisfy the fuel usage needs of the engine 10 and controls the valve 290 so that fuel cannot flow from the common fuel rail 150 to the accumulator 140. To do this the valve 290 is closed.

While in this operating state the fuel supply system 100 operates as a conventional fuel supply system as previously described with reference to FIGS. 3 and 4.

At time T0 the electronic controller 160 receives an indication from the stop-start system 20 that the engine 10 is to be stopped. In response to this indication from the stop-start system 20, the electronic controller 160, switches off the fuel injectors I1, I2, I3, I4, sets the demand level for the high pressure fuel pump 130 to a high level, preferably a maximum demand level, and controls the valve 290 so that a flow path connecting the high pressure fuel pump 130 to the accumulator 140 via the common fuel rail 150 is produced. To do this the valve 290 is moved to an open position.

Fuel is then pumped into the accumulator 140 by the high pressure fuel pump 130 until the engine 10 has stopped rotating.

As before, in a case where a signal from the fuel pressure sensor 180 associated with the accumulator 140 indicates that a maximum safe operating pressure for the accumulator 140 has been reached before the engine 10 stops rotating, it will be necessary to either reduce the demand level to the high pressure fuel pump 130 to a minimum level and/or vent fuel back to the fuel tank 110.

When the time T1 (FIG. 7) has elapsed, the engine 10 has stopped rotating and the electronic controller 160 is then operable to control the valve 290 so as to provide no flow path connecting the accumulator 140 to the common fuel rail 150 to prevent fuel leakage as previously referred to.

It will be appreciated that with such an arrangement the high pressure fuel pump 130 should be of a 'non-return flow' high pressure fuel pump or fuel could leak back to the fuel tank 110 when the accumulator 140 is connected to the common fuel rail 150 and the high pressure fuel pump 130 is operating a low demand.

Operation of the fuel supply system 100 shown in FIG. 6 during a subsequent engine start-up is as follows.

At time T0' (FIG. 8) or at a point in time after the engine 10 has sensed to have stopped but before the time T0' the electronic controller 160 is operable to set the demand level for the high pressure fuel pump 130 to a low level and preferably to the lowest possible level which in some cases is a zero flow demand level.

At time T0', the valve 290 is opened to a position required to supply fuel from the accumulator 140 to the engine 10 and the common fuel rail 150 is pressurised with fuel. Therefore, at time T0' when the stop-start system 20 indicates that the engine 10 is to be started and cranking of the engine commences, the electronic controller 160 can control whichever of the fuel injectors I1, I2, I3 and I4 has the first opportunity to inject fuel to the engine 10 to commence injection of fuel into the engine 10 without delay. As fuel is drawn from the common fuel rail 150 by the fuel injectors I1, I2, I3 and I4 it is replaced by fuel supplied to the common fuel rail 150 from the accumulator 140 thereby maintaining the fuel pressure in the fuel rail 150 at an appropriate pressure for efficient injection into the engine 10.

Because the volume of the accumulator 140 is finite, at some point in time after time T0', the electronic controller 160 is operable to close the valve 290 after which time the flow path to the engine 10 is solely from the high pressure fuel pump 130 and the demand for the high pressure fuel pump 130 is increased to the level required to supply fuel to the engine 10.

Because the high pressure fuel pump 130 is permanently connected to the common fuel rail 150, the supply of fuel is continuous and there is no actual flow switchover required. As the high pressure fuel pump 130 accelerates with the engine 10 it will reach a speed where it will be able to provide the required fuel pressure and this will normally occur before the valve 290 is closed.

One of the advantages of the third and fourth embodiments shown in FIGS. 5 and 6 respectively is that, if required, the accumulator 140 could be topped up with fuel by the high pressure fuel pump 130 at the same time fuel is being supplied to the common fuel rail 150 by the high pressure fuel pump 130.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

In this way, a method of controlling a fuel supply system of an engine of a motor vehicle wherein the method comprises, during a shutdown of the engine, operating an engine driven variable output high pressure fuel pump at a high demand level and storing fuel from the high pressure fuel pump in a fuel accumulator and, during a subsequent engine start-up, operating the high pressure fuel pump at a low demand level and supplying fuel from the accumulator to the engine. The high demand level may be the maximum demand level of the high pressure fuel pump.

The low demand level may be the minimum demand level of the high pressure fuel pump. The motor vehicle may be a stop-start enabled motor vehicle having a stop-start controller to control stopping and starting of the engine and the shutdown and subsequent start-up of the engine are initiated by the stop-start controller.

As such, a fuel supply system of an engine of a motor vehicle comprising an engine driven variable output high pressure fuel pump, a fuel accumulator to store fuel at high pressure, a valve means to control the flow of high pressure fuel within the system and an electronic controller to control the operation of the high pressure fuel pump and the valve means, wherein the controller is operable during a shutdown of the engine, to operate the high pressure fuel pump at a high demand level and control the valve means to store fuel from the high pressure fuel pump in the fuel accumulator and is operable, during a subsequent engine start-up, to operate the high pressure fuel pump at a low demand level and operate the valve means so that fuel from the fuel accumulator is supplied to the engine. The valve means may include at least one valve to selectively isolate the accumulator from the engine and the high pressure fuel pump. This has the advantage that fuel can be supplied to the accumulator only when the high pressure pump can recover energy from the engine thereby reducing the fuel consumption of the engine.

The system may further comprise a fuel reservoir, a low pressure fuel pump to supply fuel from the reservoir to the high pressure fuel pump and at least one fuel injector to supply fuel at high pressure to the engine wherein the controller is operable during a shutdown of the engine, to operate the high pressure fuel pump at a high demand level and to control the valve means to store fuel from the high pressure fuel pump in the fuel accumulator and, during a subsequent engine start-up, is operable to operate the high pressure fuel pump at a low demand level, to operate the valve means so that fuel from the fuel accumulator is supplied to the at least one fuel injector and to control the at least one fuel injector to supply fuel to the engine. There may be at least two fuel injectors, fuel may be supplied to the fuel injectors via a common fuel rail and the valve means may include at least one valve controlled by the electronic controller to control the flow of fuel between the accumulator and the common fuel rail.

This has the advantage that, if the engine is stationary for a long period of time the fuel remains stored in the accumulator with reduced risk of leakage via the at least two fuel injectors. The valve means may comprise a single diverter valve interposed between the high pressure fuel pump and the common fuel rail, between the high pressure fuel pump and the accumulator and between the accumulator and the common fuel rail. The diverter valve may have three selectable fuel flow paths, a first flow path connecting, when selected, the high pressure fuel pump to the common fuel rail, a second flow path connecting, when selected, the high pressure fuel pump to the accumulator and a third flow path connecting, when selected, the accumulator to the common fuel rail and the selection of each respective flow path is controlled by the electronic controller.

Alternatively, the valve means may comprise a first electronically controlled valve to control the flow of fuel from the high pressure fuel pump to the common fuel rail and a second electronically controlled valve to control the flow of fuel from the high pressure fuel pump to the accumulator wherein a flow path from the accumulator to the common fuel rail passes through both the first and the second electronically controlled valves.

As yet a further alternative, the valve means may comprise a first electronically controlled valve to control the flow of fuel from the high pressure fuel pump to the common fuel rail, a second electronically controlled valve to control the flow of fuel between the accumulator and the common fuel rail wherein a flow path from the high pressure fuel pump to the accumulator is also controlled by the first electronically controlled valve.

During shutdown of the engine, the first electronically controlled valve may be controlled by the electronic controller to permit fuel to flow from the high pressure fuel pump to the accumulator and the second electronically controlled valve is closed so as to prevent the flow of fuel from the accumulator to the common fuel rail. During start-up of the engine, the fuel injectors may be controlled by the electronic controller to supply fuel to the engine and the second electronically controlled valve may be controlled by the electronic controller to permit fuel to flow from the accumulator to the common fuel rail.

As yet a further alternative there may be no control valve between the high pressure fuel pump and the common fuel rail, the valve means may comprise an electronically controlled valve to control the flow of fuel between the accumulator and the common fuel rail and a flow path from the high pressure fuel pump to the accumulator may pass through the common fuel rail and the electronically controlled valve. During shutdown of the engine, all fuel injectors may be switched off by the electronic controller and the electronically controlled valve may be controlled by the electronic controller to permit fuel to flow from the high pressure fuel pump via the common fuel rail to the accumulator. During start-up of the engine, the fuel injectors may be controlled by the electronic controller to supply fuel to the engine and the electronically controlled valve may be controlled by the electronic controller to permit fuel to flow from the accumulator to the common fuel rail. The high pressure fuel pump may be a non-return high pressure fuel pump. The high demand level may be the maximum demand level of the high pressure fuel pump.

The low demand level may be the minimum demand level of the high pressure fuel pump. The motor vehicle may be a stop-start enabled motor vehicle having a stop-start controller to control stopping and starting of the engine and the shutdown and subsequent start-up of the engine may be initiated by the stop-start controller.

According to a third aspect of the invention there is provided a motor vehicle having a fuel supply system constructed in accordance with said second aspect of the invention.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an engine fuel supply system, comprising:
during a shutdown of the engine, operating an engine driven variable output high pressure fuel pump at a high demand level and storing fuel from the high pressure fuel pump in a fuel accumulator and, during a subsequent engine start-up, operating the high pressure fuel pump at a low demand level and supplying fuel from the accumulator to the engine.

2. The method of claim 1 wherein the high demand level is a maximum demand level of the high pressure fuel pump.

3. The method of claim 1 wherein the low demand level is a minimum demand level of the high pressure fuel pump.

4. The method of claim 3 wherein the motor vehicle is a stop-start enabled motor vehicle having a stop-start controller to control stopping and starting of the engine and the shutdown and subsequent start-up of the engine are initiated by the stop-start controller.

5. A fuel supply system of an engine of a motor vehicle comprising:
an engine driven variable output high pressure fuel pump, a fuel accumulator to store fuel at high pressure, a valve means to control a flow of high pressure fuel within the system and an electronic controller to control operation of the high pressure fuel pump and the valve means, wherein the controller is operable during a shutdown of the engine, to operate the high pressure fuel pump at a high demand level and control the valve means to store fuel from the high pressure fuel pump in the fuel accumulator, and is operable, during a subsequent engine start-up, to operate the high pressure fuel pump at a low demand level and operate the valve means so that fuel from the fuel accumulator is supplied to the engine.

6. The fuel supply system of claim 5, wherein the valve means includes at least one valve to selectively isolate the accumulator from the engine and the high pressure fuel pump.

7. The fuel supply system of claim 5 in which the system further comprises, a fuel reservoir, a low pressure fuel pump to supply fuel from the reservoir to the high pressure fuel pump and at least one fuel injector to supply fuel at high pressure to the engine wherein the controller is operable during a shutdown of the engine, to operate the high pressure fuel pump at a high demand level and to control the valve means to store fuel from the high pressure fuel pump in the fuel accumulator and, during a subsequent engine start-up, is operable to operate the high pressure fuel pump at a low demand level, to operate the valve means so that fuel from the fuel accumulator is supplied to the at least one fuel injector and to control the at least one fuel injector to supply fuel to the engine.

8. The fuel supply system of claim 7, wherein there are at least two fuel injectors, fuel is supplied to the fuel injectors via a common fuel rail and the valve means includes at least one valve controlled by the electronic controller to control a flow of fuel between the accumulator and the common fuel rail.

9. The fuel supply system of claim 8, in which the valve means comprises a single diverter valve interposed between the high pressure fuel pump and the common fuel rail, between the high pressure fuel pump and the accumulator, and between the accumulator and the common fuel rail.

10. The fuel supply system of claim 9, wherein the diverter valve has three selectable fuel flow paths, a first flow path connecting, when selected, the high pressure fuel pump to the common fuel rail, a second flow path connecting, when selected, the high pressure fuel pump to the accumulator, and a third flow path connecting, when selected, the accumulator to the common fuel rail, wherein the selection of each respective flow path is controlled by the electronic controller.

11. The fuel supply system of claim 8, in which the valve means comprises a first electronically controlled valve to control a flow of fuel from the high pressure fuel pump to the common fuel rail and a second electronically controlled valve to control a flow of fuel from the high pressure fuel pump to the accumulator, wherein a flow path from the accumulator to the common fuel rail passes through both the first and the second electronically controlled valves.

12. The fuel supply system of claim 8 in which the valve means comprises a first electronically controlled valve to control a flow of fuel from the high pressure fuel pump to the common fuel rail, and a second electronically controlled valve to control a flow of fuel between the accumulator and the common fuel rail, wherein a flow path from the high pressure fuel pump to the accumulator is also controlled by the first electronically controlled valve.

13. The fuel supply system of claim 12, wherein, during shutdown of the engine, the first electronically controlled valve is controlled by the electronic controller to permit fuel to flow from the high pressure fuel pump to the accumulator and the second electronically controlled valve is closed so as to prevent the flow of fuel from the accumulator to the common fuel rail.

14. The fuel supply system of claim 12 wherein, during start-up of the engine, the fuel injectors are controlled by the electronic controller to supply fuel to the engine and the second electronically controlled valve is controlled by the electronic controller to permit fuel to flow from the accumulator to the common fuel rail.

15. The fuel supply system of claim 8, wherein there is no control valve between the high pressure fuel pump and the common fuel rail, the valve means comprises an electronically controlled valve to control a flow of fuel between the accumulator and the common fuel rail and a flow path from the high pressure fuel pump to the accumulator passes through the common fuel rail and the electronically controlled valve.

16. The fuel supply system of claim 15 wherein, during shutdown of the engine, all fuel injectors are switched off by the electronic controller and the electronically controlled valve is controlled by the electronic controller to permit fuel to flow from the high pressure fuel pump via the common fuel rail to the accumulator.

17. The fuel supply system of claim 15 wherein, during start-up of the engine, the fuel injectors are controlled by the electronic controller to supply fuel to the engine and the electronically controlled valve is controlled by the electronic controller to permit fuel to flow from the accumulator to the common fuel rail.

18. The fuel supply system of claim 5, wherein the high pressure fuel pump is a non-return high pressure fuel pump.

19. The fuel supply system of claim 5, wherein the high demand level is a maximum demand level of the high pressure fuel pump.

20. The fuel supply system of claim 5, wherein the low demand level is a minimum demand level of the high pressure fuel pump.

* * * * *